United States Patent
Blaner et al.

(10) Patent No.: US 8,166,279 B2
(45) Date of Patent: *Apr. 24, 2012

(54) METHOD FOR PREDICTIVE DECODING OF A LOAD TAGGED POINTER INSTRUCTION

(75) Inventors: Bartholomew Blaner, Underhill Center, VT (US); Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/743,699

(22) Filed: May 3, 2007

(65) Prior Publication Data

US 2008/0276069 A1 Nov. 6, 2008

(51) Int. Cl.
*G06F 9/30* (2006.01)
(52) U.S. Cl. ........................................ 712/208; 712/239
(58) Field of Classification Search .................. None
See application file for complete search history.

(56) References Cited

U.S. PATENT DOCUMENTS

| 4,241,396 | A | | 12/1980 | Mitchell et al. | |
|---|---|---|---|---|---|
| 5,507,030 | A | * | 4/1996 | Sites | 717/136 |
| 5,987,595 | A | * | 11/1999 | Yoaz et al. | 712/216 |
| 6,105,125 | A | * | 8/2000 | Nemirovsky et al. | 712/209 |
| 2004/0193857 | A1 | * | 9/2004 | Miller et al. | 712/240 |
| 2005/0188185 | A1 | * | 8/2005 | Grochowski | 712/226 |

OTHER PUBLICATIONS

James E. Smith, "A Study of Branch Prediction Strategies", International Symposium on Computer Architecture, 1998, pp. 202-215.*
U.S. Appl. No. 11/933,774—Non-Final Office Action dated Sep. 30, 2010.

* cited by examiner

*Primary Examiner* — David Huisman
*Assistant Examiner* — John Lindlof
(74) *Attorney, Agent, or Firm* — Cantor Colburn LLP; Michael LeStrange

(57) ABSTRACT

Predictive decoding is achieved by fetching an instruction, accessing a predictor containing predictor information including prior instruction execution characteristics, obtaining predictor information for the fetched instruction from the predictor; and generating a selected one of a plurality of decode operation streams corresponding to the fetched instruction. The decode operation stream is selected based on the predictor information.

3 Claims, 12 Drawing Sheets

METHOD FOR PREDICTIVE DECODING OF A LOAD TAGGED POINTER INSTRUCTION

BACKGROUND

The present invention relates generally to prediction, and, more particularly, to predictive decoding.

The use of prediction techniques is advantageous in the implementation of microprocessors, as they improve system performance.

A state-of-the-art microprocessor can comprise, for example, an instruction cache for storing instructions, one or more execution units for executing sequential instructions, a branch unit for executing branch instructions, instruction sequencing logic for routing instructions to the various execution units, and registers for storing operands and result data.

An application program for execution on a microprocessor includes a structured series of macro instructions that are stored in sequential locations in memory. A current instruction pointer within the microprocessor points to the address of the instruction currently being executed, and a next instruction pointer within the microprocessor points to the address of the next instruction for execution. During each clock cycle, the length of the current instruction is added to the contents of the current instruction pointer to form a pointer to a next sequential instruction in memory. The pointer to the next sequential instruction is provided to logic that updates the next instruction pointer. If the logic determines that the next sequential instruction is indeed required for execution, then the next instruction pointer is updated with the pointer to the next sequential instruction in memory. Thus, macro instructions are fetched from memory in sequence for execution by the microprocessor.

Obviously, because a microprocessor is designed to execute instructions from memory in the sequence they are stored, it follows that a program configured to execute macro instructions sequentially from memory is one which will run efficiently on the microprocessor. For this reason, most application programs are designed to minimize the number of instances where macro instructions are executed out of sequence. These out-of-sequence instances are known as jumps or branches.

A program branch presents a problem because most conventional microprocessors do not simply execute one instruction at a time. Modern microprocessors typically implement a number of pipeline stages, each stage performing a specific function. Instructions, inputs, and results from one stage to the next are passed in synchronization with a pipeline clock. Hence, several instructions may be executing in different stages of the microprocessor pipeline within the same clock cycle. As a result, when logic within a given stage determines that a program branch is to occur, then previous stages of the pipeline, that is, stages that are executing instructions following in sequence, must be cast out to begin execution of sequential macro instructions beginning with the instruction directed by the branch, or the branch target instruction. This casting out of previous pipeline stages is known as flushing and refilling the pipeline.

Branch instructions executed by the branch unit of the processor can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch in program flow specified by an unconditional branch instruction is always taken. In contrast, conditional branch instructions are branch instructions for which the indicated branch in program flow may or may not be taken, depending upon a condition within the processor, for example, the state of a specified condition register bit or the value of a counter.

A conditional branch is a branch that may or may not occur, depending upon an evaluation of some specified condition. This evaluation is typically performed in later stages of the microprocessor pipeline. To preclude wasting many clock cycles associated with flushing and refilling the pipeline, present day microprocessors also provide logic in an early pipeline stage that predicts whether a conditional branch will occur or not. If it is predicted that a conditional branch will occur, then only those instructions prior to the early pipeline stage must be flushed, including those in the instruction buffer. Even so, this is a drastic improvement, as correctly predicted branches are executed in roughly two clock cycles. However, an incorrect prediction takes many more cycles to execute than if no branch prediction mechanism had been provided in the first place. The accuracy of branch predictions in a pipeline processor therefore significantly impacts processor performance.

Yet, present day branch prediction techniques chiefly predict the outcome of a given conditional branch instruction in an application program based upon outcomes obtained when the conditional branch instruction was previously executed within the same instance of the application program. Historical branch prediction, or dynamic branch prediction, is somewhat effective because conditional branch instructions tend to exhibit repetitive outcome patterns when executed within an application program. In addition, the BPU permits execution to continue while a branch instruction is pending.

The historical outcome data is stored in a branch history table that is accessed using the address of a conditional branch instruction (a unique identifier for the instruction). A corresponding entry in the branch history table contains the historical outcome data associated with the conditional branch instruction. A dynamic prediction of the outcome of the conditional branch instruction is made based upon the contents of the corresponding entry in the branch history table.

Yet, because most present day microprocessors have address ranges on the order of gigabytes, it is not practical for a branch history table to be as large as the microprocessor's address range. Because of this, smaller branch history tables are provided, on the order of kilobytes, and only low order bits of a conditional branch instruction's address are used as an index into the table. This presents another problem. Because low order address bits are used to index the branch history table, two or more conditional branch instructions can index the same entry. This is known as aliasing or referencing a synonym address. As such, the outcome of a more recently executed conditional branch instruction will replace the outcome of a formerly executed conditional branch instruction that is aliased to the same table entry. If the former conditional branch instruction is encountered again, its historical outcome information is unavailable to be used for a dynamic prediction.

Because dynamic predictions are sometimes not available, an alternative prediction is made for the outcome of a conditional branch instruction, usually based solely upon some static attribute of the instruction, such as the relative direction of a branch target instruction as compared to the address of the conditional branch instruction. This alternative prediction is called a static prediction because it is not based upon a changing execution environment within an application program. The static branch prediction is most often used as a fallback in lieu of a dynamic prediction. Hence, when a dynamic prediction is unavailable, the static prediction is used.

As described above, prediction techniques can cover a wide range. On one end of the spectrum are simple static prediction techniques, such as cases where "overflow is usually not present" or "the usual case does not raise an exception". More advanced predictions include some basic properties, such as "backwards branches and function returns are usually taken branches".

To improve predictive accuracy, advanced dynamic predictors have been developed, including but not limited to, one bit predictors, bimodal predictors, gshare predictor, gskew predictors, and tournament predictors. Such advanced predictors are usually employed in conjunction with branch prediction.

While predictive techniques have been successfully applied to branch prediction, other instruction types have thus far not benefited from the use of such advanced predictors. There is thus a need for efficiently and accurately predicting the execution behavior of different types of instructions and exploiting such predictions to improve instruction execution performance.

Unfortunately, the cost of implementing such predictors is high, so few facilities, other than branch prediction, can recoup the costs in terms of area, performance, and power. There is therefore a need for sharing predictors when predictors can be profitably used but their cost exceeds the benefits of a single application.

SUMMARY

According to an exemplary embodiment, a method is provided for predictive decoding. The method includes fetching an instruction, accessing a predictor containing predictor information including prior instruction execution characteristics, and obtaining predictor information for the fetched instruction from the predictor, and generating a selected one of a plurality of decode operation streams corresponding to the fetched instruction. The decode operation stream is selected based on the predictor information.

According to another embodiment, an apparatus is provided for predictive decoding. The apparatus comprises logic for fetching an instruction, a predictor containing predictor information including prior instruction execution characteristics, logic for obtaining predictor information for the fetched instruction from the predictor, and decoding logic for generating a selected one of a plurality of decode operation streams corresponding to the fetched instruction. The decode operation stream is selected based on the predictor information.

BRIEF DESCRIPTION OF THE DRAWINGS

Referring to the exemplary drawings wherein like elements are numbered alike in the several Figures.

DETAILED DESCRIPTION

According to an exemplary embodiment, a predictor is provided in conjunction with predictive-based decoding for use in predicting an optimal decode stream for different types of instructions. The predictor may be added as a new feature or may be implemented as an update to an existing predictor. In accordance with one embodiment, the predictor is shared between branch prediction logic and logic for predictively decoding. In accordance with one embodiment, a branch predictor is used to predict execution results. In another example, a component of a more complex predictor is used. Whether a branch predictor or a component of a more complex predictor is used, these types of predictors may be collectively referred to as "complex" predictors.

Figure 1A:
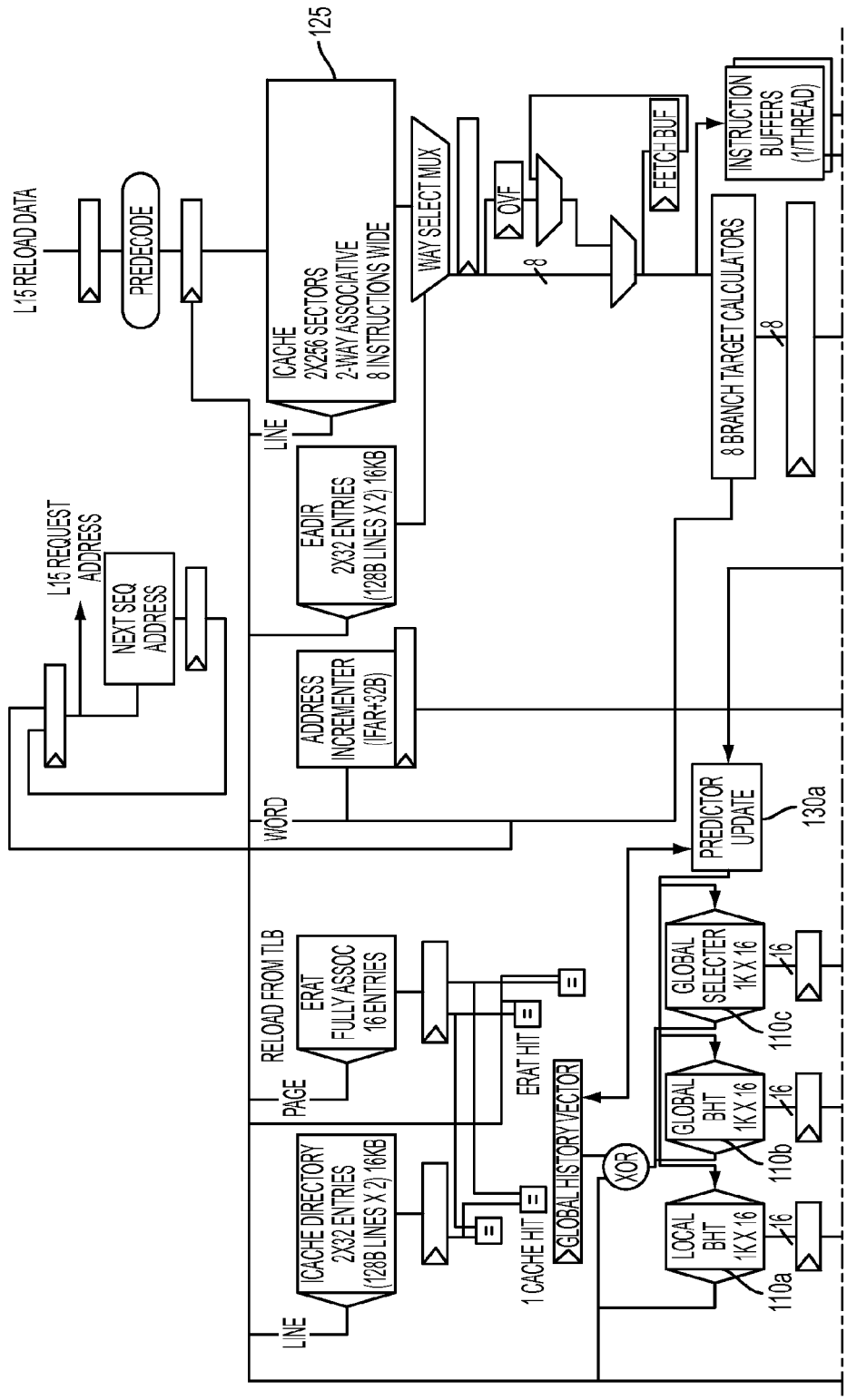
FIGS. 1A-B illustrate a conventional microprocessor with branch prediction updates.
Figure 1B:
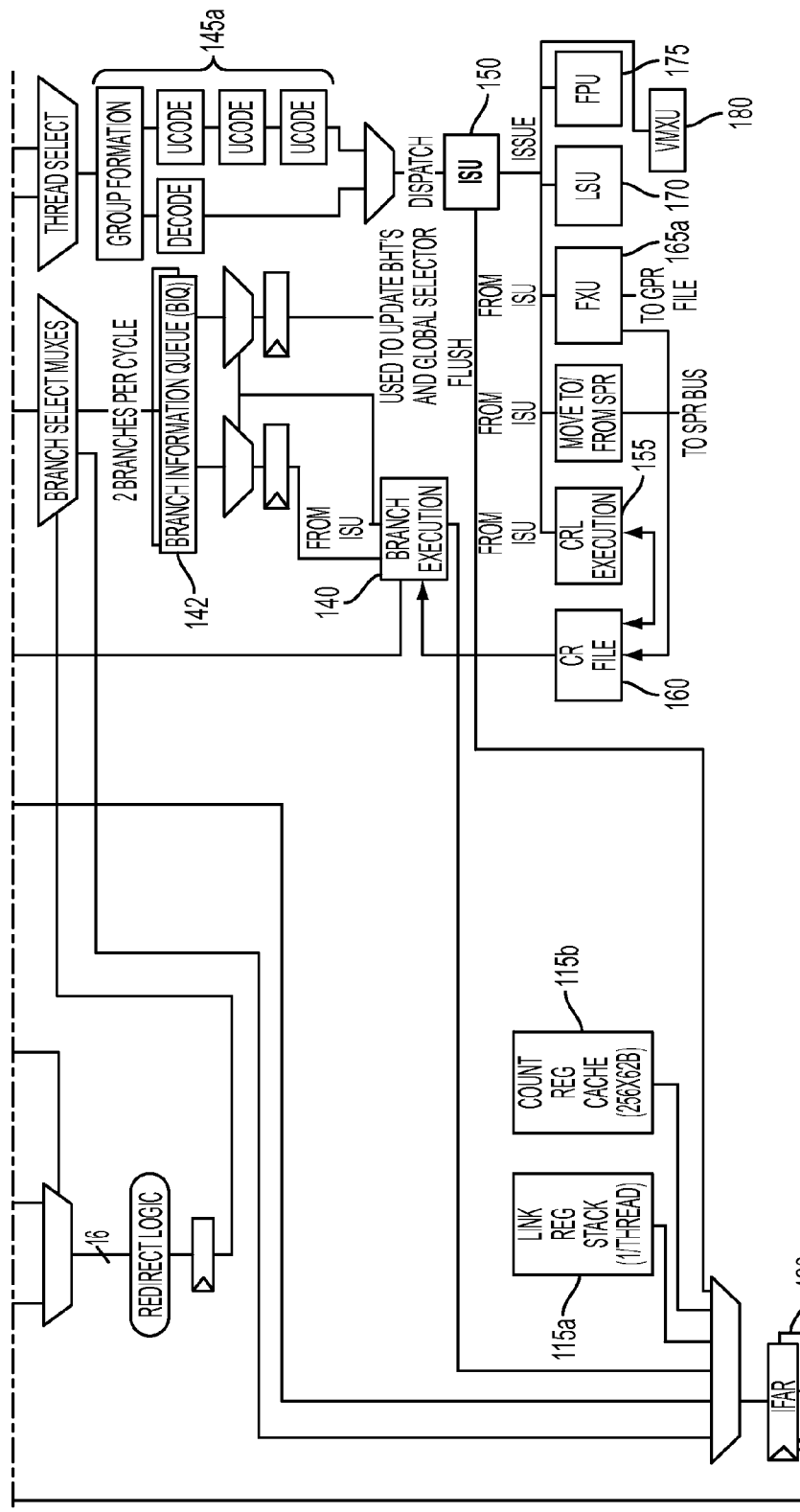

For illustrative purposes, FIGS. 1A-B illustrate a conventional processor with predictor update logic. The processor includes, among other things, prediction hardware, registers, caches, decoders, an instruction sequencing unit (ISU) 150, and instruction execution units. In particular, the prediction hardware includes Local Branch History Table (BHT) 110a, Global Branch History Table (BHT) 110b, and Global Selector 110c. The prediction hardware is accessed through an Instruction Fetch Address Register (IFAR) 120, which has the address for the next instruction fetch. In one embodiment, an instruction cache 125 fetches a plurality of instructions referred to as a "fetch group".

The cache and prediction hardware are accessed at approximately the same time with the same address. If the prediction hardware has prediction information available for an instruction in the fetch group, that prediction is forwarded to the ISU 150, which, in turn, issues instructions to units for execution. The prediction may be used to update the IFAR 120 in conjunction with branch target calculation and branch target prediction hardware (such as a link register prediction stack and a count register cache). If no prediction information is available, but the instruction decoders find a branch instruction in the fetch group, a prediction is created for that fetch group, stored in the prediction hardware and forwarded to the ISU 150.

The Branch Execution Unit (BRU) 140 operates in response to instructions issued to it by the ISU 150. The BRU 140 has read access to the condition register file 160. The Branch Execution Unit 140 further has access to information stored by the branch scan logic in the Branch Information Queue 142, to determine the success of a branch prediction, and is operatively coupled to the instruction fetch address register(s) (IFAR) 120 corresponding to the one or more threads supported by the microprocessor. The BRU 140 is further operatively coupled to cause a predictor update when the BRU 140 discovers a branch misprediction.

When the instruction is executed, the BRU 140 detects if the prediction is wrong. If so, the prediction needs to be updated. For this purpose, the processor in FIG. 1A also includes predictor update logic 130a. The predictor update logic 130a is responsive to an update indication from Branch Execution Unit 140 and configured to update array entries in one or more of the Local BHT 110a, Global BHT 110b, and Global Selector 110c. The predictor hardware 110a, 110b, and 110c may have write ports distinct from the read ports used by the instruction fetch and prediction operation, or a single read/write port may be shared. The predictor update logic 130a may further be operatively coupled to the link stack 115a and counter register stack 115b.

Referring now to the condition register file (CRF) 160, the CRF 160 is read-accessible by the BRU 140 and can be written by execution units including but not limited to the Fixed Point Unit (FXU) 165a, Floating Point Unit (FPU) 175 and Vector Multimedia eXtension Unit (VMXU) 180. The Condition Register Logic Execution unit (CRL execution) 155 (also referred to as the CRU) and SPR handling logic have read and write access to the Condition Register File (CRF) 160 (access to CRF 160 from SPR handling logic not shown in the interest of simplifying illustration). The CRU 155 performs logical operations on the condition registers stored in the CRF file 160. The FXU 165a is able to perform write updates to the CRF 160.

Referring now to FIGS. 1C-F, the instructions are issued at an ISU 150, which is relatively far removed from the predictor hardware. In accordance with an exemplary embodiment, a prediction is made and provided in conjunction with a decode sequence, or as an immediate data word provided with the decode sequence, or an internal op bit of a preferred instruction.

As in FIGS. 1A-B, the predictor architectures employed according to exemplary embodiments shown in FIGS. 1C-F may include, among other things, predictor hardware LBHT 110a, GBHT 110b and GSEL 110c. However, those skilled in the art will understand that a variety of predictor architectures can be used, and these predictors are shown by way of example only. In an exemplary embodiment, the predictor for branch prediction and prediction-based decoding may be shared. In another embodiment, there may be separate predictors, separated in either a logical or a physical fashion.

Those skilled in the art will further understand that tagged predictors or tag-free predictors can be used. Tagged predictors miss when a tag mismatch is incurred, and a predictor-based decode may use a default decode. In one embodiment, the default decode may be a safe decode handling all possible executions. In another embodiment, the decoding may generate a sequence for a dominant and preferred execution. Those skilled in the art will further understand that in tag-less predictors, a prediction from an aliased location may be used when aliasing exists, and an alias value has most recently updated a predictor.

Figure 1C:
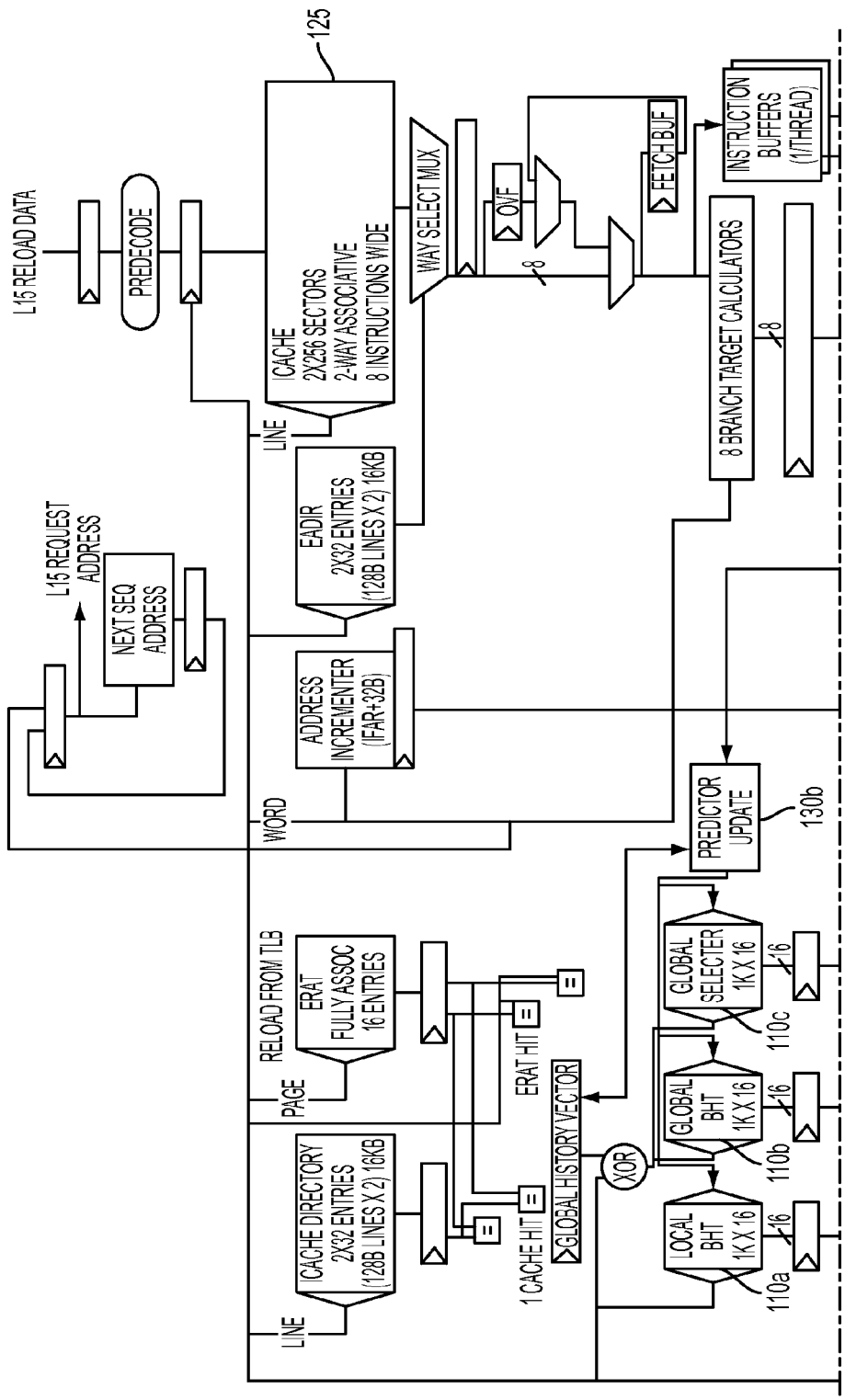
FIGS. 1C-D illustrate a microprocessor with prediction-based decoding according to an exemplary embodiment.
Figure 1D:
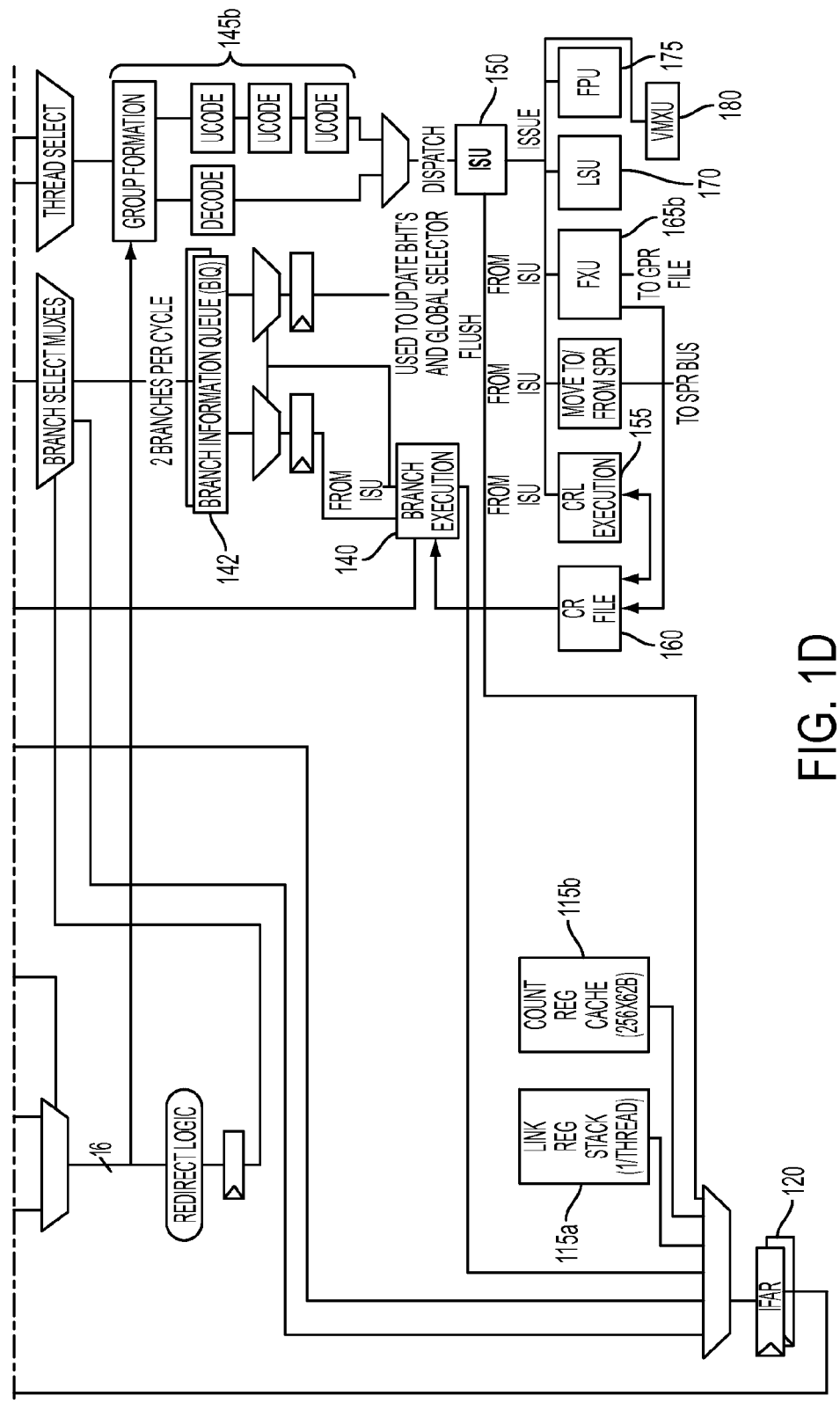

Referring now to FIGS. 1C-D, a processor is shown that has the ability to perform prediction-based decoding, but with minimal additional dataflow. To implement the capabilities described herein, access is provided to prediction bits during the instruction fetch phase to one or more blocks of logic including a group formation unit, decoding logic, and cracking and microcode logic, which breaks up a macro instruction into a plurality of iops to enable such logic to modify instruction decode and cracking in response to prediction values. These blocks of logic are collectively labeled as 145b in FIG. 1B and may be collectively referred to below as "decode logic".

According to an exemplary embodiment, logic is provided to establish correctness of predictions and to update predictions in response to the correctness and/or incorrectness of a prediction. This logic may include an FXU 165b, which determines the correctness of a prediction having been used in predictive decoding. In an exemplary embodiment, the prediction is encoded in an iop of the checking instruction. In another embodiment, the prediction is provided as an operand to the FXU 165b by the ISU 150 when instructions are issued. In one embodiment, this dataflow is simplified, by executing a sequence adapted to transfer from an FXU 165b to a microarchitectural condition register ("eCR") in the CR file 160 an indication about the correctness and/or incorrectness of a prediction as part of an FXU instruction determining such correctness or incorrectness. Read-access of the indication is provided in a subsequent iop injected by decode logic directed to BRU 140, and an update is indicated to the predictor update logic by said subsequent iop based on said value recorded in an eCR and provided as input to said subsequent iop. In one embodiment, the FXU 165b is operatively coupled to the ISU 150 to generate a pipeline flush and force a re-decode in response to an incorrect prediction.

Figure 1E:
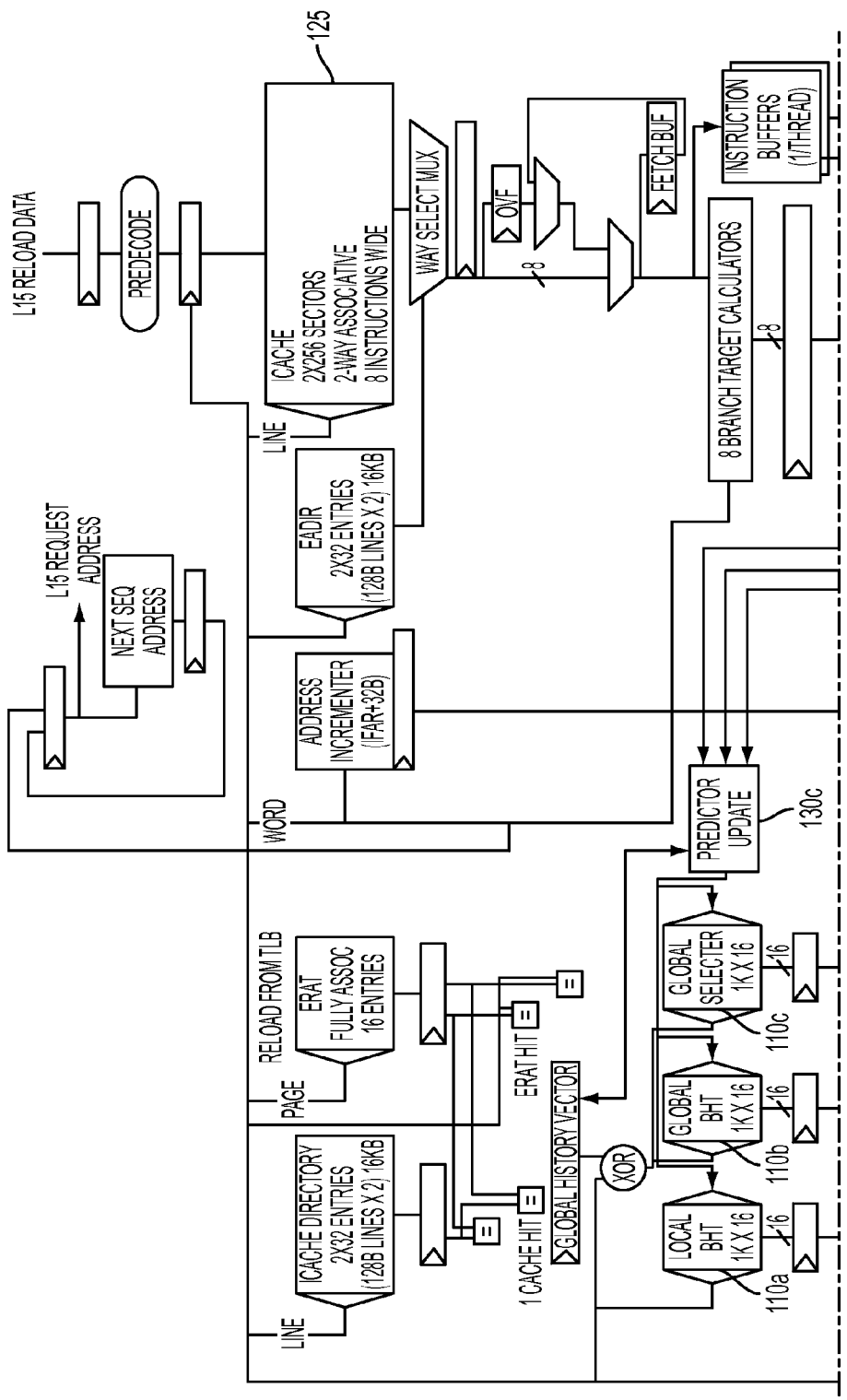
FIGS. 1E-F illustrate a microprocessor with prediction-based decoding and hardware prediction updates according to an exemplary embodiment.
Figure 1F:
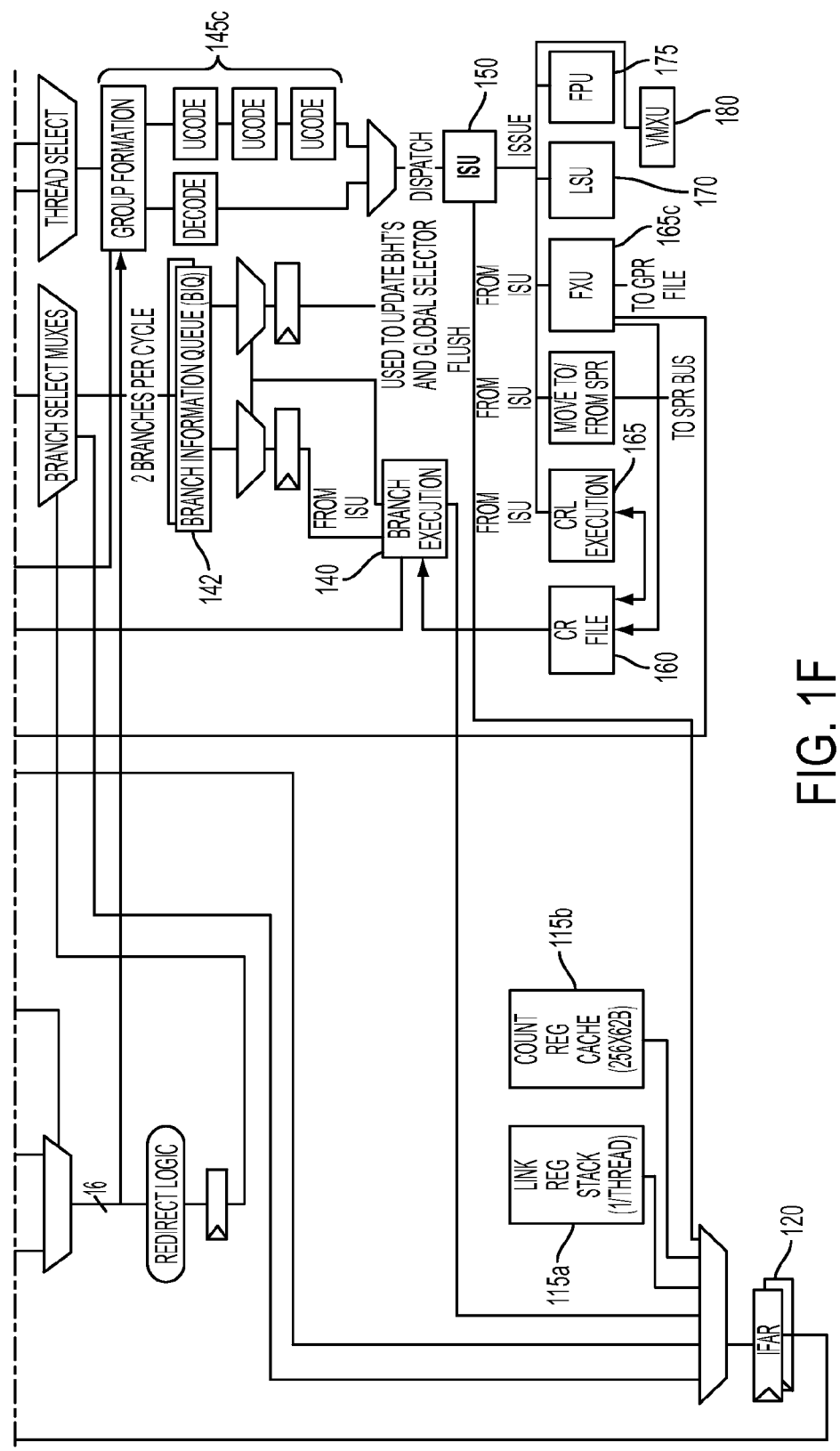

Referring now to FIGS. 1E-F, a processor is shown having the ability to perform prediction based decoding, optimized with hardware prediction update paths, according to another exemplary embodiment. To implement the capabilities herein described, access to prediction bits is provided during the instruction fetch phase to one or more blocks of logic including group formation logic, decode, and cracking and microcode logic to enable such logic to modify instruction decode and cracking in response to prediction values. These blocks of logic are collectively labeled as 145c in FIG. 1C and may be collectively referred to below as "decode logic".

According to an exemplary embodiment, logic may also be provided to establish a prediction when none is found in response to encountering an instruction to be preferably decoded using prediction-based decode, and using a default prediction when none is found. In one embodiment, this logic is coupled to group formation and decode logic.

In addition, an FXU 165c is provided with logic to determine the correctness of a prediction having been used in predictive decoding. In one embodiment, the prediction is encoded in an iop of the checking instruction. In another embodiment, the prediction is provided as an operand to the FXU 165c by the ISU 150 when instructions are issued.

In one embodiment, similar to that shown in FIG. 1C-D, the FXU 165c is operatively coupled to the ISU 150 to generate a pipeline flush and force a re-decode in response to an incorrect prediction. In addition, according to this embodiment, the FXU 165c may be operatively coupled to the predictor update logic 130c, allowing the FXU 165c to update the predictor hardware in response to correct and incorrect predictions having been used by prediction-based decode flow.

In the embodiments described above, a variety of prediction methods may be used. For example, Gshare can be used for predictors, where paths have a strong connection to the value being predicted. In other instances, local instruction-address based prediction may be more suitable. For other predictor scenarios, tournament predictors are more ideal.

According to exemplary embodiments, updates to the predictor for both sequential and branch instructions may be performed via the Branch Execution Unit 140. According to one embodiment, updates are sent to the Branch Execution unit, and an "update predictor micro-op" (or internal op iop) is executed.

In one embodiment, a mechanism used ordinarily to report computation outcomes may be used to transfer prediction results. An example of such a mechanism is a condition register (CR). Ordinarily, the CR is used to report the outcome of a computation, e.g., whether the results less-than, greater-than, or equal-to zero have been tested by a branch instruction. In this embodiment, an extended (unarchitected) CR field records the prediction result in a register file 160 accessible from the BRU 140. The update predictor instruction then receives the outcomes of the prediction from the CR field. In another embodiment, the path through instruction execution may be used to set one of the two desired predictor values, e.g., update predictors guarded by control/decode flow.

In an exemplary embodiment, a predictor is used to select the speculative output results produced. In accordance with this embodiment, for a Load Tagged Pointer (ltptr) sequence, a predictor indicates whether to provide the loaded results or a null value to the next operation. The ltptr instruction was defined for the IBM iSeries processor architecture (Power PC AS, also known as AS/400) to improve performance when operating on tagged pointers in operating system environments, such as IBM's OS/400 environment. A tagged pointer handling apparatus is explained in detail in commonly assigned U.S. Pat. No. 4,241,396, herein incorporated by reference. In accordance with this apparatus, an ltptr instruction loads a pointer from a specified address if an associated tag indicates the memory location to hold a valid address, and an associated specifier matches the expected pointer specifier. Otherwise, if the specified storage location either does not have a tag indicating a valid pointer, or the pointer specifier is not matched, a NULL address is loaded to the target register.

Ideally, the ltptr instruction should execute with the same load-use latency as the Load Doubleword (ld) instruction. Examples of prediction include: "LTPTR is null pointer or not", "will have denormalized number or not", "will hit/miss in cache", "will be aligned/unaligned", etc. While the description that follows focuses on an ltptr sequence for illustrative purposes, it should be appreciated that the invention is not limited to predictions for ltptr sequences.

Using the ltptr instruction sequence for illustrative purposes, according to an exemplary embodiment, an instruction may be executed to record the outcome of the selected operation that has been predicted in a condition register. This operation is performed to get the execution results in a register accessible from the BRU 140 and perform a subsequent predictor update. An eCR is selected to record the results in non-architected state. This is possible according to exemplary embodiments because all instruction execution units have the ability to update condition registers.

In a specific case, the update for the correctly predicted case always causes a transition to the "strongly predicted" state. In one sequence, the prediction result is transmitted as part of the opcode, or an operand. The prediction result may be also transmitted to indicate if an update is necessary. Special care should be taken to ensure that the prediction update to indicate correct prediction is not speculated ahead of actual prediction resolution. This is of particular importance when dependences are not visible to the instruction sequencing unit, but rather are implicit in the sequencing of instructions. This can be achieved by making the instruction sequence depend on an output generated by a prediction resolution or by making the instruction complete at the commit point. Conversely, when a misprediction for a predictively decoded instruction triggers both a predictor update based on an update iop, and a pipeline flush to force re-decode predictively decoded instruction, care must be taken that the flush does not prevent the predictor update iop from having effect. This can be accomplished in a variety of different ways, including having the update instruction forcing the flush, allowing the re-decode flush only after an update has been performed, or performing the update as a part of the newly generated decode sequence after the flush has taken effect.

Figure 2:
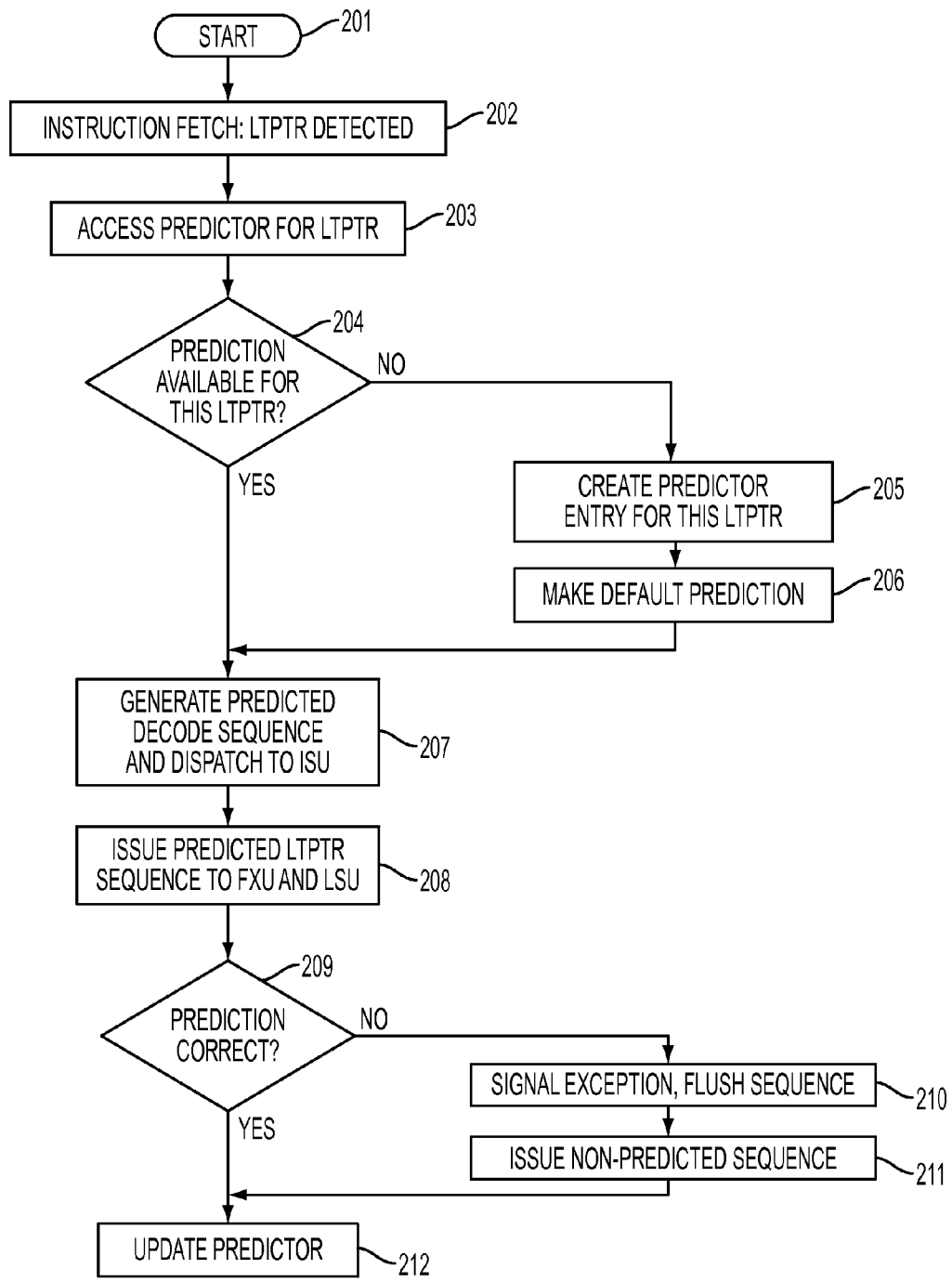
FIG. 2 illustrates a method for predictive decoding and updating according to an exemplary embodiment.

FIG. 2 is a flowchart showing a method for predictive decoding according to an exemplary embodiment. The process starts at step 201. At step 202, an instruction, e.g., an ltptr instruction, is detected and fetched, causing an access to the predictor in step 203. At step 204, a determination is made whether there is prediction information available for the ltptr instruction. If the predictor does not have predictor information available for the ltptr instruction, the process moves to step 205 at which a predictor entry is created for the ltptr. At step 206, a default prediction is made. The default predictor entry may be the generally most common case, which for an ltptr would be a "non-null pointer returned". If prediction information is determined to be available for the ltptr at step 204 or a default prediction is made at step 206, then a predicted ltptr decode sequence, also referred to as a decode operation stream, is generated and dispatched at step 207 to the ISU 150 shown in FIGS. 1B-1C. The predicted sequence is dispatched in this example. The sequence of operations to execute the ltptr may differ, depending on the prediction.

At step 208, the sequence is issued to FXU 165b, 165c and LSU 170, and a determination of whether the prediction was correct is made at step 209. If the prediction is correct, the predictor may be updated, depending on the type of predictor. Those skilled in the art will appreciate that the prediction updates are only needed during the recovery sequence for a 1-bit predictor. For a 2-bit predictor, a correct prediction may optionally also update the outcome to reflect transitions from a weakly predicted state to a strongly predicted state.

If the prediction is determined not to be correct at step 209, the sequence is flushed at step 210, and the ltptr is re-executed in a non-predicted, i.e., deterministic, process and issued at step 211. Finally, step 212 is taken to update the prediction information based on the outcome of the more-recent execution.

According to an exemplary embodiment, different code sequences can be generated as part of decoding (which occurs as part of the dispatching step 207 shown in FIG. 2). The different code sequences may be based on the prediction value, the confidence value, or during a playback for the prediction when re-execution occurs. In some scenarios, it may not be necessary to flush and re-enter execution when misprediction occurs, if the assumption is made that a certain value is frequent and predicted under control of the predictor or otherwise computed. This is a bit slower but alleviates flushing. In another scenario, a sequence may be predicted to be a null-ptr, and the output may be made immediately available. This would require recovery if the prediction is wrong by flushing and re-decoding (e.g., possibly but not necessarily in microcode). Another sequence may be predicted to be a null pointer, but code may be generated to test whether in fact it is a null pointer and handle non-null pointers if they are discovered. Since the code can handle all scenarios, no flush is necessary, but this scenario is slower than predicting the non-null pointer correctly. In yet another scenario, a prediction may be made with high confidence that the sequence is a null pointer, and a NULL sequence may be generated and checked later. This requires recovery when the prediction is wrong, by flushing and re-decoding, possibly but not necessarily in microcode.

The description above shows how there can be multiple decode scenarios based on a predictor when the predictor is a multi-bit predictor. This may be referred to as "prediction-based decoding" and may be further understood with reference to FIGS. 3-5, which illustrate exemplary methods for generating different code sequences as part of the decoding in step 207 in FIG. 2.

Those skilled in the art will understand that steps described in this exemplary embodiment can be performed in parallel, or re-ordered, or otherwise optimized within the scope of the invention.

Figure 3:
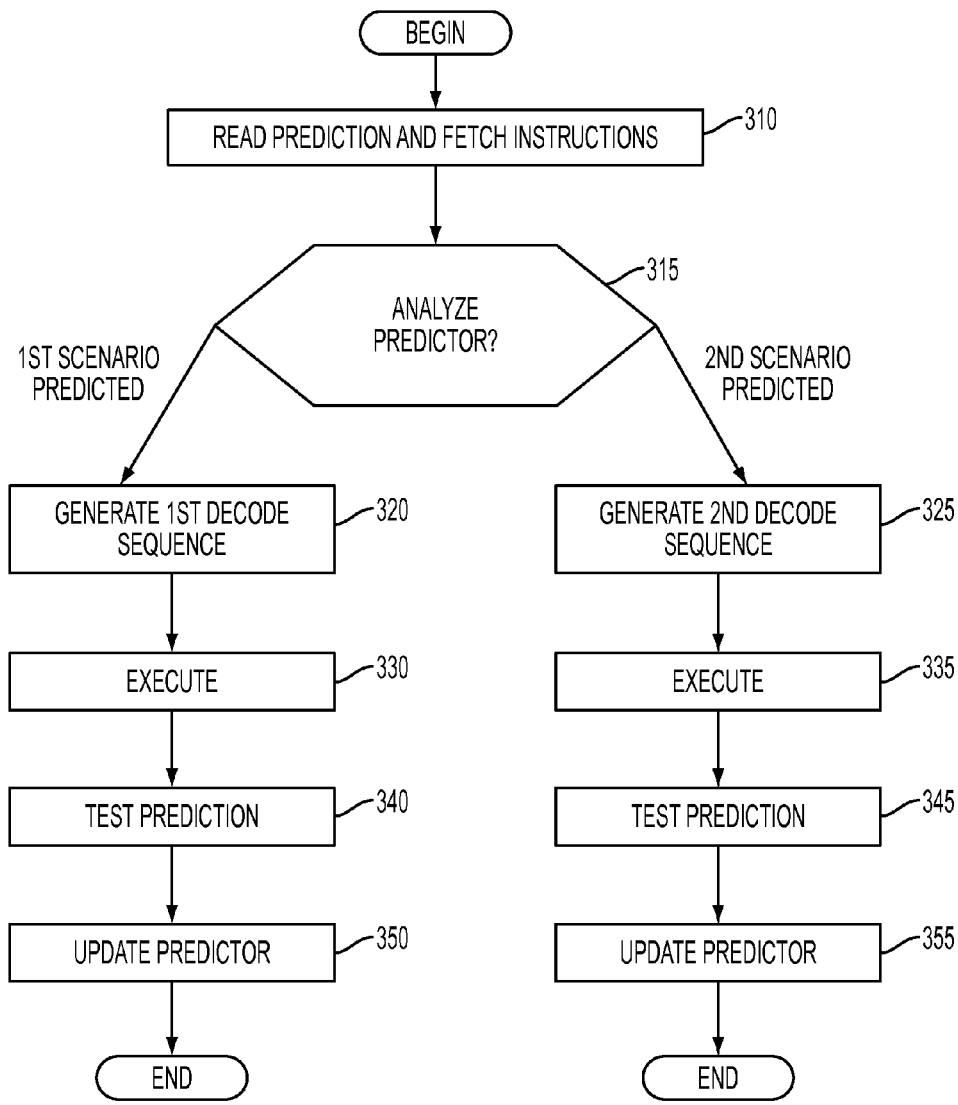
FIG. 3 illustrates details of a method for prediction-based decoding according to an exemplary embodiment.

FIG. 3 illustrates a method for prediction-based decoding according to an exemplary embodiment, wherein the prediction-based decoding may be performed by one or more components of logic 145b or 145c shown in FIGS. 1C-D and FIGS. 1E-F, respectively. For example, in one embodiment, prediction-based decoding is performed by the decode unit. In another embodiment, prediction-based decoding is performed by a combination of group formation logic, decoding logic and microcode logic. In another embodiment, a distinct predictive decode logic block (not shown) may perform prediction-based decoding. Those skilled in the art will appreciate that other logic may be used to execute the method described herein. Furthermore, additional logic may be provided to implement the method in execution units, verify the correctness of prediction, and update predictors.

Referring to FIG. 3, the method starts with step 310 at which instructions are fetched and predictor results are read, e.g., by a combination of blocks in an Instruction Fetch Unit (IFU). The IFU includes, among other things, the IFAR 120, instruction cache 125, and the blocks collectively labeled as 145b and 145c. Those skilled in the art will understand that fetched instructions not corresponding to predictively decoded instructions may be handled traditionally in a manner not described with reference to the method shown in FIG. 3.

Next, at step 315, the prediction results are analyzed by blocks within the IFU to determine what scenario the results are associated with. If the results indicate a first scenario, the method proceeds to step 320. In step 320, one or more iops (internal operations) corresponding to a first decode sequence are generated. This step may be performed by decode logic, microcode, a combination of the two, or other logic properly adapted to decode instructions and generate decode sequences. Next, at step 330, the iop sequence is executed by one or more function units, e.g., the FXU 165b or 165c. At step 340, the prediction is tested, e.g., by the FXU 165b or 165c. At step 350, the predictor is updated as appropriate, e.g., by the predictor updaters 130b or 130c, and the method ends.

If, at step 315, the prediction results are determined to relate to a second scenario, the method proceeds to step 325. In step 325, one or more iops corresponding to a second decode sequence are generated. This step may be performed by decode logic, microcode, a combination of the two, or other logic properly adapted to decode instructions and generate decode sequences. Next, at step 335, the iop sequence is executed by one or more function units. At step 345, the prediction is tested, e.g., by the FXU 165b or 165c. At step 355, the predictor is updated as appropriate, and the method ends.

In the exemplary embodiment described above, both the first and second sequences can generate a full set of results, but the sequences may be optimized to perform particularly well for a particular scenario.

Further, those skilled in the art will understand that more than a single bit of information can be sampled, and decode sequences can be generated corresponding to a first, second, third, fourth, fifth, and so forth scenario, each having distinct properties and decode sequences of varying length and complexity.

Referring now to another embodiment, decode sequences may be optimized to perform even better when the scenario is correctly predicted. Accordingly, when a misprediction occurs, then a corrective action must be performed, such as flushing the pipeline, and generating an alternate sequence. In one embodiment, the alternate sequence resides in microcode. In another scenario, it is generated by decode logic. An additional state is also provided to record the presence of a recovery condition, with at least a 1 bit state element recording the fact and the nature of the recovery. Additional bits may be present for recording specific corrective actions necessary, and optionally recording whether to recover to a specific scenario.

Figure 4:
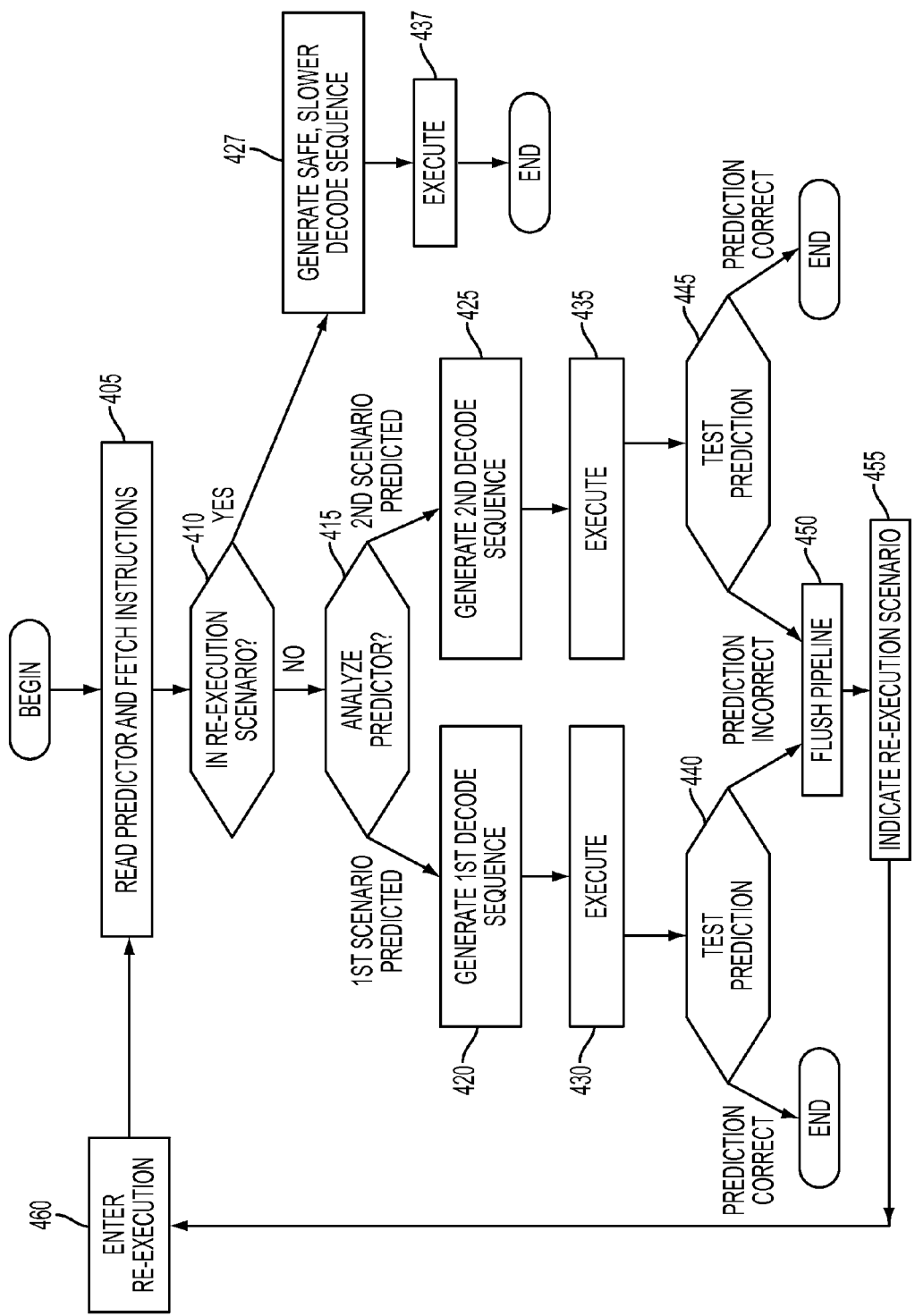
FIG. 4 illustrates details of a method for prediction-based decoding with recovery according to an exemplary embodiment.

Referring now to FIG. 4, a method is shown for predictive decoding with recovery. The method starts with step 405. In step 405, instructions are fetched and predictors are read, e.g., by a combination of blocks in the IFU as described above. Those skilled in the art will understand that fetched instructions not corresponding to predictively decoded instructions are handled traditionally and are not shown in the method. Next, at step 410, a state element is analyzed by a block within the IFU to determine if a re-execution and recovery scenario is present. If so, the method proceeds to step 427, explained in further detail below. Otherwise, the method proceeds to step 415. In step 415, the prediction results are analyzed to determine what scenario they are associated with. If the prediction results indicate a first scenario, the method proceeds to step 420 at which one or more iops corresponding to a first decode sequence is generated using decode logic, microcode, a combination of the two, or other logic properly adapted to decode instructions and generate decode sequences.

Next, at step 430, the iop sequence is executed by one or more function units. Then, at step 440, the prediction is tested. If the prediction is incorrect, the method continues to step 450 at which point the pipeline is flushed as described in detail below. Otherwise, the method terminates.

If, at step 415, the predictor indicates a second scenario, the method proceeds to step 425. In step 425, one or more iops corresponding to a second decode sequence are generated using decode logic, microcode, a combination of the two, or other logic properly adapted to decode instructions and generate decode sequences. Then, at step 435, the iop sequence is executed by one or more function units. At 445, the prediction is tested. If the prediction is incorrect, the method continues to step 450 at which point the pipeline is flushed. Otherwise, the method terminates. After the pipeline is flushed at step 450, a re-execution scenario is indicated for recovery at step 455, and re-execution is entered at step 460 as described in detail below.

Referring back to step 410, if re-execution has occurred, then in step 427, one or more iops corresponding to a "safe" decode sequence are generated. The safe decode sequence is a sequence that is able to operate on all scenarios, regardless of predictive scenario. This decode sequence may be generated by decode logic, microcode, a combination of the two, or other logic properly adapted to decode instructions and generate decode sequences. Next, at step 437, the iop sequence is executed by one or more function units, and the method terminates.

In one embodiment, an execution unit accomplishes a pipeline flush and recovery by indicating the test failure of test steps 440 and 445 to the ISU 150. The ISU 150 then executes steps 450, 455 and indicates re-execution to the IFU. The IFU records re-execution in at least one state bit and starts fetching at the re-execution address corresponding to an address corresponding to the recovery of the predictively decoded instruction (e.g., either the address of said instruction, or of a group containing said instruction, or of a bundle containing said instruction etc.). Those skilled in the art will understand that prediction updates for the decode prediction when a misprediction has been detected can be performed either in a sequence corresponding to the sequence initially detecting the misprediction or subsequent to the recovery procedure. When the predictor update is performed in the original sequence detecting the misprediction and forcing recovery through a pipeline flush, care must be taken to allow the prediction update to complete in spite of a pending flush and recovery request.

In one embodiment, recovery information records a new predictive scenario, used to build a predictive recovery sequence based on the input operand state, in one or more bits. Those skilled in the art will understand that more than a single bit of information can be sampled, and decode sequences can be generated corresponding to a first, second, third, fourth, fifth, and so forth scenario, each having distinct properties and decode sequences of varying length and complexity.

Figure 5:
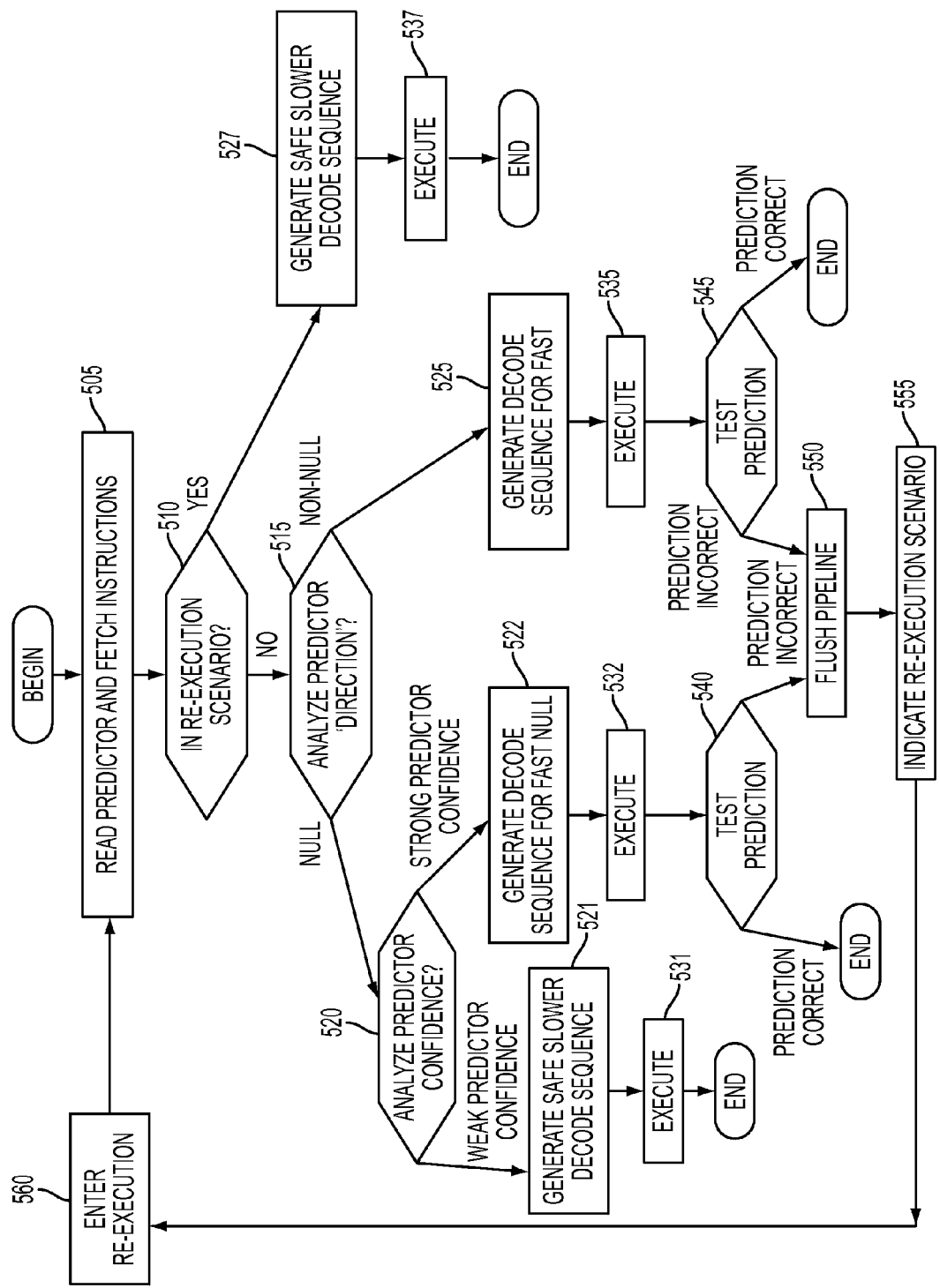
FIG. 5 illustrates a method for predictive decoding for an ltptr instruction according to an exemplary embodiment.

Referring now to a hybrid, multi-bit decode predictive decode sequence, FIG. 5 shows predictive decoding for an ltptr instruction. In FIG. 5, the method starts at step 505 at which instructions are fetched and predictors are read, e.g., by a combination of blocks in the IFU. Those skilled in the art will understand that fetched instructions not corresponding to predictive decoding of ltptr are handled traditionally and are not shown in the method. Next, at step 510, a state element is analyzed to determine if a re-execution and recovery scenario is present. If not, the method proceeds to step 515 at which the prediction "direction" is analyzed to determine if the prediction results indicate a first scenario corresponding to the LTPTR pointer being predicted to be set to NULL or if the predictor indicates a second scenario corresponding to the value not being set to NULL. If the "direction" prediction indicates that the pointer is predicted to be set to NULL, the method proceeds to optional step 520. At step 520, a second predictor bit, corresponding to confidence of prediction is analyzed. If confidence is low, the method proceeds to step 521. If the confidence is high, the method proceeds to step 522. If optional step 520 is not present, the method proceeds from step 515 to 521, without analyzing predictor confidence. In step 521, a safe code for handling all input operand values of the LTPTR instruction is generated using decode logic, microcode, a combination of the two, or other logic properly adapted to decode instructions and generate decode sequences. One or more iops corresponding to a safe, slower decode sequence are generated. If, at step 520, a strong confidence is detected, a decode sequence optimized for input scenarios resulting in a NULL result is generated at step 522. The sequence is generated using decode logic, microcode, a combination of the two, other logic properly adapted to decode instructions and generate decode sequences. One or more iops corresponding to a decode sequence for a fast null pointer are generated.

From step 521, the method proceeds to step 531, at which the iop sequence is executed by one or more function units. Then, the method ends.

From step 522, the method proceeds to step 532, at which point the iop sequence is executed by one or more function units. Then, at step 540, the prediction that the inputs will cause a NULL output is tested. If the prediction is correct, the method terminates. Otherwise, the method continues to step 550 at which the pipeline is flushed. After the pipeline is flushed at step 550, a re-execution scenario is indicated for recovery at step 555. Then, at step 560, re-execution is entered.

If at step 515, it is determined that the "direction" of the prediction results indicates a non-null pointer, the method proceeds to step 525 at which point a decode sequence corresponding to a predicted NON-NULL result is generated. One or more iops corresponding to the NON-NULL decode sequence result may be generated by decode logic, microcode, a combination of the two, or other logic properly adapted to decode instructions and generate decode sequences. The output will be read and passed without tests, followed by a test and recovery in the generated iop sequence. From step 525, the method proceeds to step 535 at which point the iop sequence is executed by one or more function units. At step 545, the prediction is tested. If the prediction is incorrect, the method continues to step 550 at which point the pipeline is flushed as described above. Otherwise, the method terminates.

If, at step 510, it is determined that re-execution has not occurred, one or more iops corresponding to a "safe" decode sequence for the LTPTR instruction are generated at step 527. This "safe" decode sequence is adapted to being able to operate on all combinations of inputs to the LTPTR instruction. Decode logic, microcode, a combination of the two, or other logic properly adapted to decode instructions and generate decode sequences may be used to generate the "safe" decode sequence. Next, at step 537, the iop sequence is executed by one or more function units. The method then terminates.

According to exemplary embodiments, prediction updates can take a variety of forms and can occur in the sequence indicating a misprediction or in the recovery sequence. For the embodiment depicted in FIG. 5, a multi-bit predictor, e.g., a bimodal 2-bit predictor yielding a prediction and a confidence level is used. Such a predictor should be updated even by execution sequences not indicating a misprediction to allow predictors to reach a strong confidence level.

What will follow now is a detailed description of the execution of decode sequences, and the initiation of recovery according to an exemplary embodiment.

Referring back to FIG. 2, after dispatching occurs, steps 208-212 are performed during which the predicted sequence is issued, tested for correctness, and if not correct, flushed and replaced with a non-predicted sequence. The predictor is then updated. These steps are shown in detail in FIGS. 6 and 7, according to exemplary embodiments.

Figure 6:
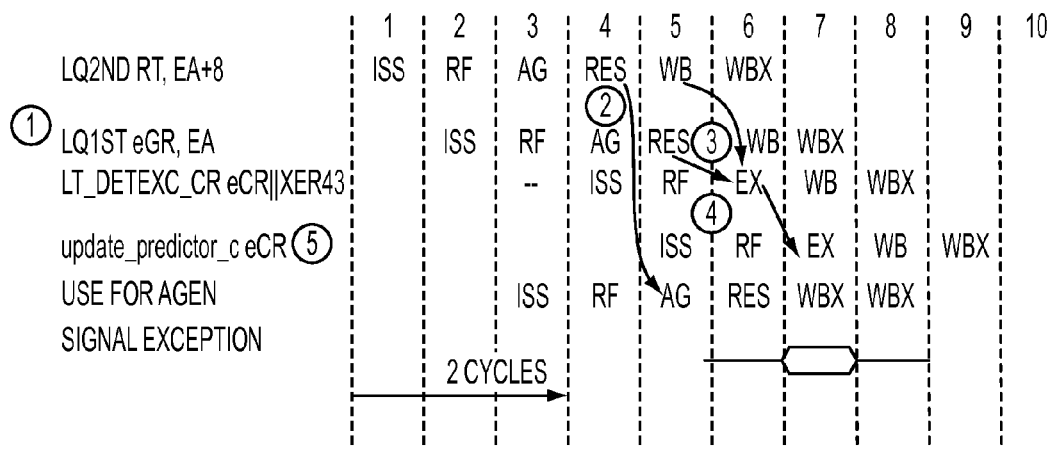
FIG. 6 illustrates details of a non-null pointer prediction sequence according to an exemplary embodiment.

FIG. 6 illustrates steps taken for a predicted non-null pointer ltptr sequence. Referring to FIG. 6, sequence 601 is issued for a predicted ltptr instruction with a non-null pointer. The ltptr is cracked into four iops. The LQ2ND iop returns what is assumed to be a non-null pointer from the memory location at EA+8 (wherein EA is the effective address specified as input to the LTPTR instruction) to an instruction using the output of the LTPTR as its input with the lowest latency possible. The LQ1ST returns data from EA needed to determine if the prediction is correct. LT_DETEXC_CR calculates whether the prediction was correct. This status is transmitted to the predictor and the subsequent update_predictor_c iop via the eCR. The eCR performs encoding {prediction status, correct prediction value}={correct prediction, non-null pointer}. Further, if the prediction is incorrect, an exception is signaled so the processor may take corrective action by flushing the sequence and rerunning the ltptr. The update_predictor_c (the "c" suffix means conditional) iop uses the eCR to update the prediction information in the predictor if the prediction is correct. If the prediction is not correct, update_predictor_c is NOPed.

The update_predictor_c iop executes in the branch pipeline, thereby having access to the branch prediction tables via prediction update logic in accordance with FIG. 1B. The instruction reads the eCR and updates the predictor table by using the prediction instruction to record the desired outcome for a future prediction. Although the instruction executes in the branch pipeline, it does not cause a branch redirect.

In one embodiment, the update_predictor_c instruction is completion serialized. That is, the issue unit ensures it will only be executed when no flush occurs. In another embodiment, the update_predictor_c instruction execution understands when to suppress updates based on the correctness/incorrectness of the code sequence.

Figure 7:
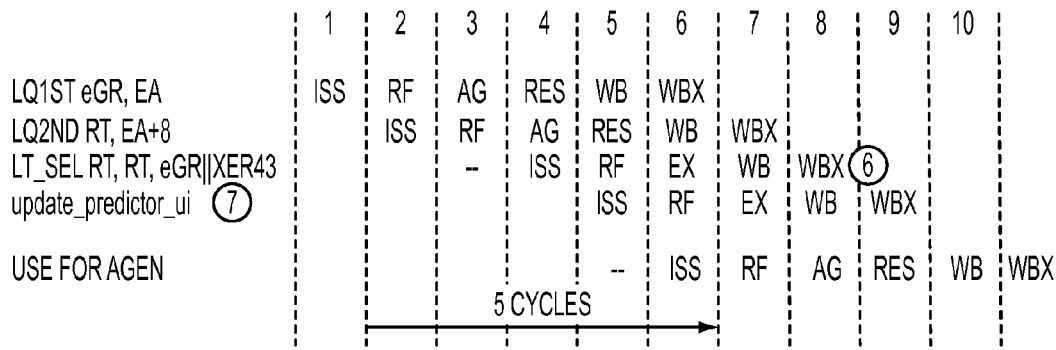
FIG. 7 illustrates details of a null pointer prediction sequence according to an exemplary embodiment.
Figure 7:
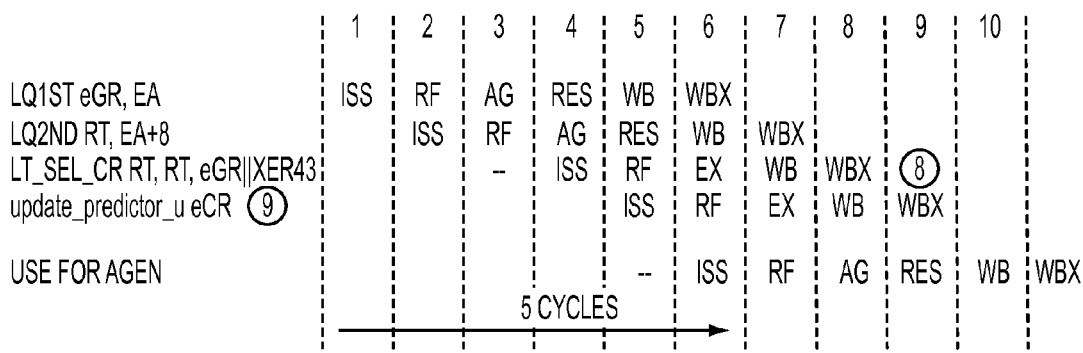

FIG. 7 illustrates steps taken for a null pointer ltptr sequence. Specifically, sequence 701 is executed in response to a misprediction recovery (e.g., corresponding to the sequence generated by step 427 of FIG. 4, and 527 of FIG. 5), and sequence 702 corresponds to a sequence generated in response to a predicted sequence generating a NULL pointer (e.g., generated by an exemplary predictive decode step 521 of FIG. 5).

Sequence 701 is issued for rerunning (reexecuting) the ltptr after a predicted non-null pointer misprediction. The LT_SEL conditionally zeros RT if the pointer should be null based on the data fetched from EA and XER(43). The update_predictor_ui (the "ui" suffix meaning unconditional, incorrect prediction) iop unconditionally updates the predictor with {incorrect prediction, null pointer}.

In sequence 701, it is necessary that the LT_SEL be conditional in case another process changes the value of the quadword at EA in between the time it was fetched for sequence 601. That way, RT always is written with the correct value. It is possible that update_predictor_ui updates the predictor with wrong information, e.g., what should have been a null pointer is now non-null because another process changed its value. However, this will not lead to incorrect program results but only cause a slight performance penalty in what should be a rare case.

Sequence 702 is issued for a predicted null pointer ltptr. The LT_SEL_CR conditionally zeros RT if the pointer should be null based on the quadword data fetched from EA and XER (43). It encodes either {incorrect prediction, non-null pointer} or {correct prediction, null-pointer} on the eCR depending on the outcome of the ltptr. The update_predictor_u (the "u" suffix meaning unconditional) iop uses the eCR to unconditionally update the predictor. Because the final RT is always correct in this sequence, no misprediction re-run is required.

Sequence 702 is non-optimal with respect to latency because non-null pointer is an infrequent case for ltptr. In an alternative embodiment, the null pointer sequence has the same or better latency as the non-null pointer sequence, e.g.,

| | |
|---|---|
| LI | RT=0 |
| LQ1ST | eGR \|\| XER43, EA |
| LT_DETEXC_CR | eCR, eGR \|\| XER43 |
| update_predictor_c | eCR |

According to another embodiment, the prediction is not expressed in a different iop sequence issued to the FXU but as an operand to a load and a conditionally zero result (LCZ_pred). A common sequence is issued, and LCZ_pred is used with a predictor to generate one of the memory loaded value and zero.

In one embodiment, using LCZ_pred, a separate predictor is implemented. In another embodiment, a branch predictor is shared to provide prediction for the LCZ_pred. Ideally, the prediction result generated by the instruction fetch is provided in the instruction buffer and encoded as a portion of the internal operation code, as a data bit, or using another mechanism, to the FXU, LSU, or other such instruction execution unit providing a speculative early result.

In accordance with one embodiment having a separate predictor, the predictor can be speculatively updated by the execution unit or during the instruction commit phase.

As described above, according to exemplary embodiments, predictive decoding can be based on a variety of predicted execution attributes, based on specific expected input and output values, or based on convergence characteristics of particular algorithms for a set of inputs or outputs; it can select from a variety of decode sequences, including ones which can successfully generate correct results for all conditions, and decode sequences which generate a correct result for a subset of possible executions, and require recovery for other sets of inputs and/or outputs. Recovery can take the form of one or more, or a combination of, flushing and redecoding either speculatively on a new prediction or non-speculatively based on execution attributes discovered during the aborted execution being recovered, optionally based on recorded information about input and/or output and/or convergence and/or other characteristics, and can be handled in one of hardware decode, microcode, firmware, operating system software or application software, optionally including one or more of executing a pipeline flush, or an exception. Those skilled in the art will understand that the mechanisms described herein can be implemented in hardware, in software, or a combination of both within the scope of the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for predictive decoding comprising:
fetching a load tagged pointer instruction, the load tagged pointer instruction comprising an associated pointer, the pointer having an associated tag and an associated indicator;
accessing a predictor containing predictor information for the fetched load tagged pointer instruction including prior instruction execution characteristics;
obtaining the predictor information for the fetched load tagged pointer instruction from the predictor;
determining whether the predictor information indicates a null value or a non-null value for the pointer associated with the load tagged pointer instruction;
analyzing a predictor confidence in response to determining that the predictor information indicates a null value for the pointer associated with the load tagged pointer instruction, wherein analyzing the predictor confidence comprises:
generating a safe decode sequence in response to determining that the predictor confidence is weak; and
generating a fast null decode sequence in response to determining that the predictor confidence is strong; and
generating a fast decode sequence in response to determining that the predictor information indicates a non-null value for the pointer associated with the load tagged pointer instruction.

2. The method of claim 1, wherein generating the fast null decode sequence in response to determining that the predictor confidence is strong further comprises: executing the fast null decode sequence; determining whether the predictor information indicating a null value for the pointer associated with the load tagged pointer instruction is correct based on the execution, and, in response to determining that the predictor information is incorrect, causing a pipeline flush.

3. The method of claim 1, wherein generating the fast decode sequence in response to determining that the predictor information indicates a non-null value for the pointer associated with the load tagged pointer instruction further comprises: executing the fast decode sequence; determining whether the predictor information indicating a non-null value for the pointer associated with the load tagged pointer instruction is correct based on the execution, and, in response to determining that the predictor information is incorrect, causing a pipeline flush.

* * * * *